(12) United States Patent  
Gardner et al.

(10) Patent No.: US 6,701,352 B1
(45) Date of Patent: Mar. 2, 2004

(54) METHOD AND APPARATUS FOR IMPORTING INFORMATION FROM A NETWORK RESOURCE

(75) Inventors: David P. Gardner, New Milford, CT (US); Steven Kaye, Weston, CT (US); Jeff Pierce, Norwalk, CT (US)

(73) Assignee: Pitney Bowes Inc., Stamford, CT (US)

(*) Notice: Subject to any disclaimer, the term of this patent is extended or adjusted under 35 U.S.C. 154(b) by 0 days.

(21) Appl. No.: 08/891,984

(22) Filed: Jul. 11, 1997

(51) Int. Cl.$^7$ ............................................. G06F 15/16
(52) U.S. Cl. ........................ 709/218; 709/219; 709/229
(58) Field of Search ............................... 709/217–219, 709/203, 229; 707/10

(56) References Cited

U.S. PATENT DOCUMENTS

| | | | |
|---|---|---|---|
| 4,084,242 A | 4/1978 | Conti | 364/466 |
| 4,122,532 A | 10/1978 | Dlugos et al. | 364/900 |
| 4,773,027 A | 9/1988 | Neumann | 364/550 |
| 4,872,119 A | 10/1989 | Kajimoto | 364/464.03 |
| 5,016,197 A | 5/1991 | Neumann et al. | 364/550 |
| 5,117,373 A | 5/1992 | Huff | 364/550 |
| 5,321,604 A | 6/1994 | Peach et al. | 364/401 |
| 5,572,643 A | 11/1996 | Judson | 395/793 |
| 5,589,892 A | 12/1996 | Knee et al. | 348/731 |
| 5,615,120 A | 3/1997 | Schwartz et al. | 364/464.17 |
| 5,621,727 A | 4/1997 | Vaudreuil | 370/60 |
| 5,625,818 A * | 4/1997 | Zarmer et al. | 707/9 |
| 5,634,053 A | 5/1997 | Noble et al. | 395/604 |
| 5,768,581 A * | 6/1998 | Cochran | 395/200.36 |
| 5,778,367 A * | 7/1998 | Wesinger, Jr. et al. | 709/217 |
| 5,796,393 A * | 8/1998 | MacNaughton et al. | 709/218 |
| 5,802,518 A * | 9/1998 | Karaev et al. | 395/200.59 |
| 5,819,271 A * | 10/1998 | Mahoney et al. | 707/9 |
| 5,893,091 A * | 4/1999 | Hunt et al. | 709/218 |
| 5,911,776 A * | 6/1999 | Guck | 709/217 |

FOREIGN PATENT DOCUMENTS

| | | |
|---|---|---|
| EP | 0 774 722 A2 | 11/1996 |
| JP | 06232867 | 8/1994 |
| WO | WO95/29452 | 11/1995 |

OTHER PUBLICATIONS

European Patent Office; Visual Representation of Database Query Definition; 02/91; US vol. :33, Nr 9, PG 238–242.
Yuwono, Budi & Lee, Dik L.; Search and Ranking Algorithms for Locating Resources on the World Wide Web; Feb. 26, 1996;pp. 164 through 171.
IBM—Technical Disclosure Bulletin; Storing Query Objects By Type In A Relational Database; Sep. 1, 1989;vol. 32 No. 4B.

* cited by examiner

Primary Examiner—Patrice Winder
Assistant Examiner—Philip B. Tran
(74) Attorney, Agent, or Firm—Ronald Reichman; Paul A. Levitsky; Angelo N. Chaclas (57) ABSTRACT

Information stored at a resource remotely located across a network is automatically imported according to pre-defined selection criteria, formatted in a form usable by a local processing resource, stored in the formatted form, and provided to the local processing resource for use by it. In one embodiment, a mailing list manager has an import module coupled to a browser. The import module receives a set of user-defined information selection criteria. The import module commands the browser to establish a network connection to a remote network resource containing desired information. When the connection is established, the browser requests information from the remote network resource according to the selection criteria. Information received from the network resource is stripped of unnecessary information, formatted for use by the mailing list manager and stored in a database maintained by the mailing list manager. In a preferred embodiment, the network resource is a Web server with a search page that is coupled to a searchable database of addresses, and the addresses are usable in a mailing list.

21 Claims, 9 Drawing Sheets

SEARCH CRITERIA ☐ MORE

- ☐ NAME, FIRST ☐ = ☐ < ☐ > [_____]
- ☐ NAME, LAST ☐ = ☐ < ☐ > [_____]
- ☐ ADDRESS ☐ = ☐ < ☐ > [_____]
- ☐ CITY ☐ = ☐ < ☐ > [_____]
- ☐ STATE ☐ = ☐ < ☐ > [_____]
- ☒ ZIP ☐ = ☒ < ☐ > [95.999]
- ☐ PHONE NUMBER
- ☐ GENDER ☐ MALE ☒ FEMALE

[IMPORT] [CLEAR] [CANCEL]

METHOD AND APPARATUS FOR IMPORTING INFORMATION FROM A NETWORK RESOURCE

BACKGROUND OF THE INVENTION

1. Field of the Invention

The present invention relates generally to computer systems, and more particularly relates to automatically selecting and importing information from a network resource, and formatting the information for use by a local processing resource.

1. Description of Related Art

The globally accessible computer network known as the Internet is a vast resource of information, much of which is available at no direct cost. A local computer can connect to a distant server, request a file or an image from the server, and receive the requested information immediately without a direct charge for the value of the information.

One popular technology enjoying wide use with the Internet is known as the World Wide Web. The World Wide Web enables a computer to locate a remote server using a server name in an agreed-upon format that is indexed at a central Domain Name Server (DNS); the computer can then establish a connection to the server and retrieve information using a communication protocol called the Hypertext Transfer Protocol (HTTP). A Uniform Resource Locator (URL) uniquely identifies each page of information stored on the remote server. A URL is a form of network address that identifies the location of information stored in a network. The local computer requests information by providing a request containing a URL of the desired information to the remote server. The pages of information are files prepared in the Hypertext Markup Language (HTML).

As use of the World Wide Web has soared, many different sources of free information have become available. The information is free in the sense that the server that provides the information makes no direct charge to an end user who requests or receives the information.

One type of free information service is a directory service. A directory service is a remote server coupled to a database containing names, addresses, telephone numbers and other information about businesses and individuals derived from public telephone directories and other sources. Exemplary directory servers include the "four11" telephone directory server identified by the URL http://www.four11.com/, http://www.Bigbook.com/, http://yp.gte.net/, http://www.Bigyellow.com/. Some systems offer free access to database of individual address information, effectively operating as free "white pages" services. Other systems provide free access to databases of business address information, effectively operating as globally accessible, free "Yellow Pages" directories.

Using any Web browser program, a user can connect to these systems, provide a query, and receive information, such as a set of names, addresses, and telephone numbers. The user's local computer can make an HTTP connection using a browser to the remote server of a directory service. The user commands the browser to retrieve a home page of the remote server. The user enters a query in the home page to request a set of information from the database and returns the query with the home page to the server. The server parses the query, interrogates the database according to the query, receives a set of records from the database, formats the records by placing them in a template document prepared in the HTML language, and delivers the completed HTML document containing the records to the local computer.

After the information is received in an HTML document displayed by the browser, the set of names can be displayed one HTML page at a time using the browser, cut from each HTML document, pasted into a file prepared with a text editor or word processor program, and manually edited into a mailing list.

Alternatively, the set of names can be cut from the HTML document, stored in a text file using a word processor, edited to add field delimiters between values of each record, and provided as input to a mailing list management program. Each of these steps is manually performed, separately. The mailing list management program reads the text file, separates records and values by identifying the field delimiters, and places the values in a pre-defined mailing list database. The mailing list management program can then generate mailing labels, form letters, reports, and other documents using the mailing list database.

While directory services provide information that can be used to manually build a mailing list from free information available over a network, the approaches described above have several significant disadvantages. For example, manually building a mailing list using cut-and-paste editing operations with a word processor is tedious, time-consuming, and error-prone. It is desirable to provide an automatic way for a user to define desired free information, retrieve the free information from a remote server over a network, and format the information into a form usable by a local processing resource.

Also, directory services have the disadvantage that considerable time is required to format information received from the directory service. Further, additional time is needed to instruct a local processing resource how to receive the formatted information. Therefore, it is also desirable to provide an automatic way to carry out these steps and provide the resulting list to a local processing resource for subsequent use.

Further, as the number of Web servers has increased, it has become more difficult for a person exposed to several different Web servers or URLs to keep track of the names of each Web server and its URL for later use. Many URLs are quite long and need to be spelled with 100% accuracy to be useful. They include unusual typed characters such as colons, backslashes and "@" characters. These characters and other parts of the URL must be remembered and reproduced correctly, or the URL cannot be used successfully to retrieve a Web page.

For all these reasons, there is a need for methods, apparatus and products that can request and retrieve information from a remote source; format the information for local use; and pass the formatted information for local use. There is also a need for such methods, apparatus and products that can retrieve such information in an automatic way, and automatically format the information for use by a local processing resource.

SUMMARY OF THE INVENTION

The invention provides a method, apparatus, and computer program product for importing information from a network resource. In one embodiment, a method according to the invention comprises the steps of storing selection criteria in a memory coupled to a local processing resource; requesting the information from the remote resource according to the selection criteria; receiving the information from the remote resource over the network; and providing the information to the local processing resource in a format usable by the local processing resource. One feature of this embodiment is connecting to the remote resource using an application program driven by the local processing resource. In one aspect, the application program is a browser, and the browser is driven using a bridge. In another aspect, the browser is driven by the local processing resource using OLE Automation.

Another feature of the invention is storing, in the memory, a list of remote information sources located on the network, and a profile describing a format of information at one of the remote information sources. In one aspect, the information at the remote information source is converted from one format to a second format usable by the local processing resource according to the profile. In another aspect, an import function of the local processing resource is invoked, and using the import function, the information is stored in the second format in a database coupled to the local processing resource. In yet another aspect, the profile is retrieved from a central data storage location on the network.

Another feature of the invention is providing the information by executing a browser, and commanding the browser using the local processing resource to connect to the remote information source over the network.

Still another feature of the invention is storing a query in a Web page in a storage device coupled to a browser. In one aspect, requesting the information involves submitting the Web page to a Web server using the browser. In another aspect, receiving the information includes receiving an output Web page into the Web browser over the network. In yet another aspect, providing the information involves writing a raw mailing list derived from the output Web page on the storage device, formatting the raw mailing list into a formatted list based upon a format of a database coupled to a mailing list manager, and importing the formatted list into the database of the mailing list manager using an import function of the mailing list manager.

The invention also encompasses a computer apparatus and a computer program product having the foregoing features and aspects.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the system of the present invention will be apparent from the following description in which.

DETAILED DESCRIPTION OF THE PREFERRED EMBODIMENTS

A method, apparatus and computer program product for automatically importing information from a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The detailed descriptions that follow may be presented in terms of program procedures, routines or processes executed on a computer or network of computers. These procedural descriptions and representations are the means used by those skilled in the art to most effectively convey the substance of their work to others skilled in the art.

A procedure, routine, or process is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. Principally for reasons of common usage, at times it is convenient to refer to these signals as bits, values, elements, symbols, characters, terms, numbers, or the like. It should be noted, however, that all of these and similar terms are associated with physical quantities and are merely convenient labels applied to such quantities.

Further, the manipulations performed are often referred to in terms, such as adding or comparing, which are commonly associated with mental operations performed by a human operator. No such capability of a human operator is necessary, or desirable in most cases, in any of the operations described herein that form part of the present invention; the operations are machine operations. Useful machines for performing the operation of the present invention include general-purpose digital computers or similar devices.

The present invention also relates to apparatus for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings described in this document, or it may prove more convenient to construct more specialized apparatus to perform the described method steps. The required structure for a variety of these machines will appear from the description given.

Figure 1A:
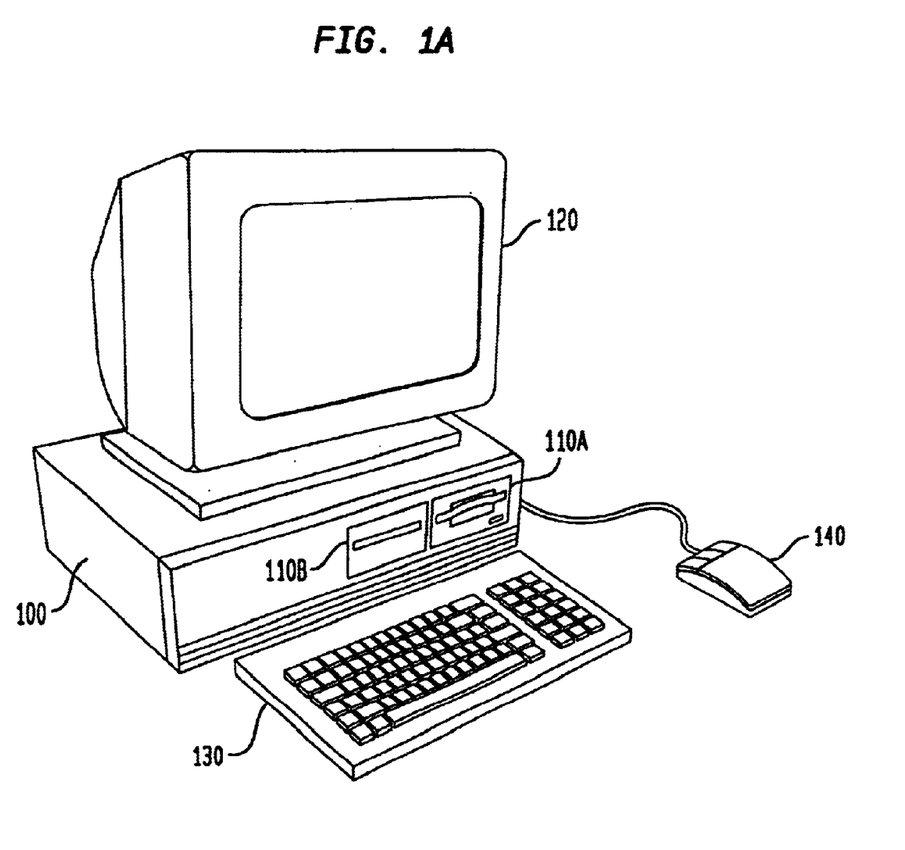
FIG. 1A illustrates a computer of a type suitable for carrying out the invention.

FIG. 1A illustrates a computer of a type suitable for carrying out the invention. Viewed externally in FIG. 1A, a computer 2 has a central processing unit 100 having disk drives 110A and 110B. Disk drive indications 110A and 110B are merely symbolic of a number of disk drives that might be accommodated by the computer 2. Typically, these would include a floppy disk drive such as 110A, a hard disk drive (not shown externally) and a CD ROM drive indicated by slot 110B. The number and type of drives varies, typically, with different computer configurations. The computer 2 has a display 120 upon which information is displayed. A keyboard 130 and a mouse 140 are typically also available as input devices. Preferably, the computer 2 illustrated in FIG. 1A is a personal computer.

Figure 1B:
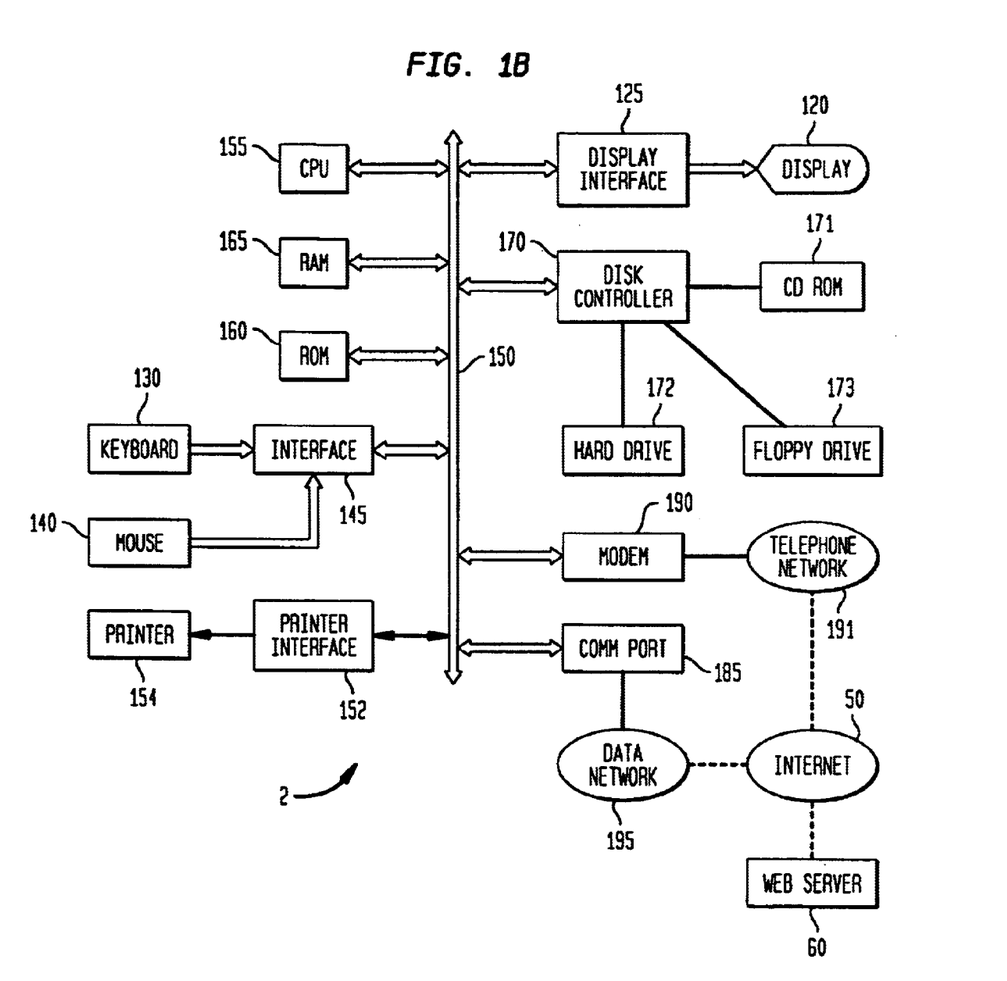
FIG. 1B is a block diagram of the computer of FIG. 1A.

FIG. 1B illustrates a block diagram of the internal hardware of the computer 2 of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or Digital Video Disk (DVD) drives such as 171. A display interface 125 interfaces a display 120 and permits information from the bus to be viewed on the display. A printer interface 152 interfaces the bus 150 to a printer 154 and permits information from the bus to be printed on the printer.

The modem 190 is connected to a telephone network 191 in the usual manner. Communications with a network 195 or with other external devices can occur over communications port 185.

In one embodiment, the data network 195 is coupled to a globally accessible computer network such as the Internet 50. Alternatively, the network 195 is a local area network. For example, using a modem bank 190 and telecommunications software, the computer can call a ISP and establish a dial-up connection to the Internet 50. A remote Web server 60 is connected to the network. The remote server 60 contains source documents, such as pages formatted in the HTML language, or websites referenced in a source document. In conjunction with a mailing list manager program, a computer 2 in this arrangement can be used for generating and managing mailing lists and related documents. For example, the computer 2 may run the Pitney Bowes Smart-Mailer program. Using the SmartMailer program or another mailing list manager, a user defines a database of addresses to be stored on the hard disk 172. The user enters data representing addresses into the database. The user also prepares one or more form documents or templates, such as brochures or form letters, using word processing functions of the mailing list manager. The user queries the database using selection criteria that specify a range of addresses within the database, such as businesses involved in a particular field or market. Using pre-defined instructions, the user can instruct the mailing list manager to create a copy of a form document for each of the selected addressees and to insert the addressee's address into the form document. The user can then instruct the mailing list manager to print each customized document, and an envelope addressed to the addressee, on the printer 154. The form documents and selection criteria are stored on the hard disk 172 for subsequent use. The mailing list manager also can print mailing labels, envelopes and the like according to various selection criteria.

The present invention is related to the use of computer 2 to import information from a network. According to one embodiment, importing information from a network is performed by computer 2 in response to CPU 155 executing sequences of instructions contained in memory 160, 165. Such instructions may be read into the memory from another computer-readable medium, such as data storage devices 171, 172, 173. Alternatively, the instructions are downloaded from the Web server 60 through the Internet 50 and the modem 190 or the communications port 185. The downloaded instructions are stored in one of the data storage devices 171, 172, 173 and are then loaded into the memory 160, 165. Execution of the sequences of instructions contained in the memory causes CPU 155 to perform the process steps that will be described hereafter. In alternative embodiments, hard-wired circuitry may be used in place of or in combination with software instructions to implement the present invention. Thus, the present invention is not limited to any specific combination of hardware circuitry and software.

A URL is a network address or a reference to a remote World Wide Web server 60 or website. URLs generally are formatted according to the following template:

<protocol id>:// {<server>} <second level domain><top level domain> {<directory>} {<file>}

The <protocol id> identifies the transmission protocol to be used. For example, in the case of the Web it is <http>, and in the case of an anonymous file transfer protocol transaction it is <ftp>. The <server> element is an optional server name such as <www.>. The <server> element may also identify a directory on a storage device of the Web server 60 that contains HTML documents. The <second level domain> element is the name of the server domain as found in the DNS table, such as <pitneybowes>. The <top level domain> element identifies the type of the second level domain, and must be an item selected from a finite set of globally recognized top level domains, such as "com," "org," "mil," "edu," "gov," and others. The <directory> element is an optional name of a directory within the <server>, such as <DocumentRoot/>. The <file> element is an optional name of a file, document or image to be retrieved, such as <Index.html>. Thus, a URL serves as one type of a network address to locate a document anywhere in a network.

Figure 2A:
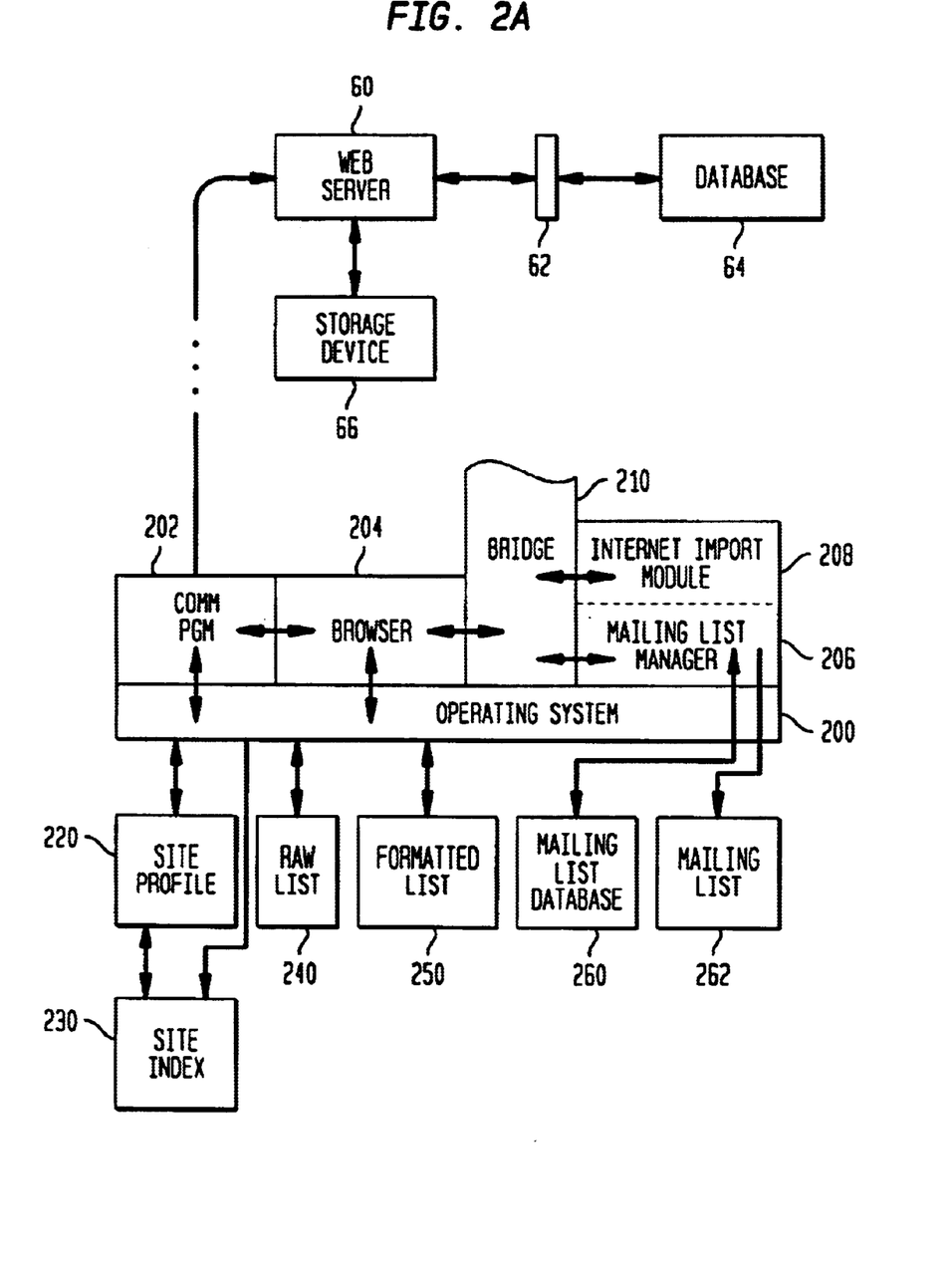
FIG. 2A is a block diagram of a software architecture of one embodiment of the invention.

FIG. 2A is a block diagram of a software architecture with which an embodiment of the present invention can be implemented.

An operating system (OS) 200 is installed in the central processing unit 100 of computer 2, such as on the hard drive 172. In conventional manner, the OS 200 is loaded by the CPU 155 into the main memory when the computer is powered up. The OS 200 controls and supervises the operation of one or more local processing resources. In one embodiment, the local processing resources are application software programs, and the OS 200 facilitates interaction of the application programs with functions of the OS 200 and of the hardware elements of the computer 2.

In the embodiment of FIG. 2A, the application programs are a communications program 202, a World Wide Web browser 204, and a mailing list manager 206. Each of the application programs runs on the system, for example, by residing in the main memory (160, 165) or in the data storage devices 171, 172, 173, for execution by the CPU 155.

The communications program 202 enables the OS 200 and other application programs to connect to the data network 195 or the telephone network 191. For example, under control of the OS 200 or an application program, the communications program 202 commands the modem 190 to take a telephone line connected to the modem 190 off-hook, wait for dial tone, and place a telephone call to an ISP. The communications program 202 establishes a connection with the ISP. When an application program writes data to the communications port 185 or to the modem 190, the communications program 202 converts the data to a form usable by the modem or the port. Exemplary commercially available communications programs are ProCOMM, and the TCIP dialer programs generally. When Microsoft Windows95 is used as the OS 200, the communications program 202 is integrated with the OS 200.

The browser 204 reads a document prepared in HTML that is stored on the hard disk 172 or the Web server 60, interprets the HTML tags contained in the document, and displays graphics, text, and other elements encoded in the document on the display 120.

The mailing list manager 206 is an application program that creates and maintains a mailing list database 260, and prepares a mailing list 262 based upon the mailing list database 260. The mailing list manager 206 reads and writes the mailing list database 260, and writes the mailing list 262, through a generic file input/output system integrated into the OS 200. The mailing list manager 206 can add, delete, or modify records in the mailing list database 260, query the mailing list database 260 and select records from it based upon a user-provided query in a structured query language, and prepare reports or mailing lists. An exemplary commercially available computer program that can be used as the mailing list manager 206 is the Pitney Bowes SmartMailer product.

The browser 204 may obtain a document from the Web server 60 by establishing an HTTP connection through the communications program 202 to the Web server 60. The Web server 60 runs a Web server program that uses the HTTP protocol to respond to the browser 204. The Web server 60 has a storage device 66 that stores documents such as HTML format documents or Web pages. To obtain a document from the Web server 60, the browser 204 issues a request in the HTTP protocol, such as an HTTP GET command, with the name of the desired document as an argument to the command. In response, the Web server 60 searches the storage device 66 for the requested document. If it is found, the Web server loads the document and delivers it over the HTTP connection to the browser 204. The HTTP connection is then disconnected.

The Web server 60 is coupled through a firewall 62 to a database 64. The database 64 contains data or HTML documents for delivery to browsers that contact the Web server 60. The firewall 62 prevents unauthorized requests for documents from reaching and possibly corrupting the database 64.

Bridge software 210 runs in connection with the OS 200 and acts as a link between the application programs. The bridge software 210 enables one application program to communicate with another application program through an agreed-upon, shared inter-application communication scheme. In one embodiment, the bridge software 210 provides a distributed object communication facility. An application program can write data to an object, and invoke a transport routine to cause the bridge software 210 to transport the object to another application program. The receiving application program extracts a message and data from the object and acts upon them.

In a preferred embodiment, the OS 200 is the Microsoft Windows95 operating system, and the bridge software 210 is the Object Linking and Embedding (OLE) Automation facility integrated into the Microsoft Windows95 operating system. Using OLE Automation, one application program written for use with OLE Automation can control or drive the operation of another application program that is also written for use with OLE Automation. Using OLE Automation, a first application program is called a server component, and is controlled by a second application program called an automation client or automation controller.

An automation controller is driven by a scripting language, or forms a part of an application program. Automation is carried out using a dynamic object method invocation facility of OLE known as dispatchable interfaces. Using dynamic dispatching under OLE, an automation client can invoke a method or manipulate a property of a server component by a late binding mechanism. At run time, the automation client obtains a dispatch identifier from a type library associated with the server component. The dispatch identifier is passed to an "invoke" method of OLE Automation that resolves which method of the server component to call at run time. The type library is created at run time by an object definition language (ODL) file that describes interfaces of the server component. The ODL file is prepared by the programmer who writes the server component.

OLE and OLE Automation are described in detail in R. Orfali et al., *The Essential Distributed Objects Survival Guide*; (New York: John Wiley & Sons, Inc., 1996), at pp. 283–296 and pp. 425–532.

Alternatively, the bridge software 210 can be an Object Request Broker (ORB) that complies with the Common Object Request Broker Architecture (CORBA), or the bridge software 210 can be the OpenDoc system as defined by Apple Computer, Inc.

Figure 2B:
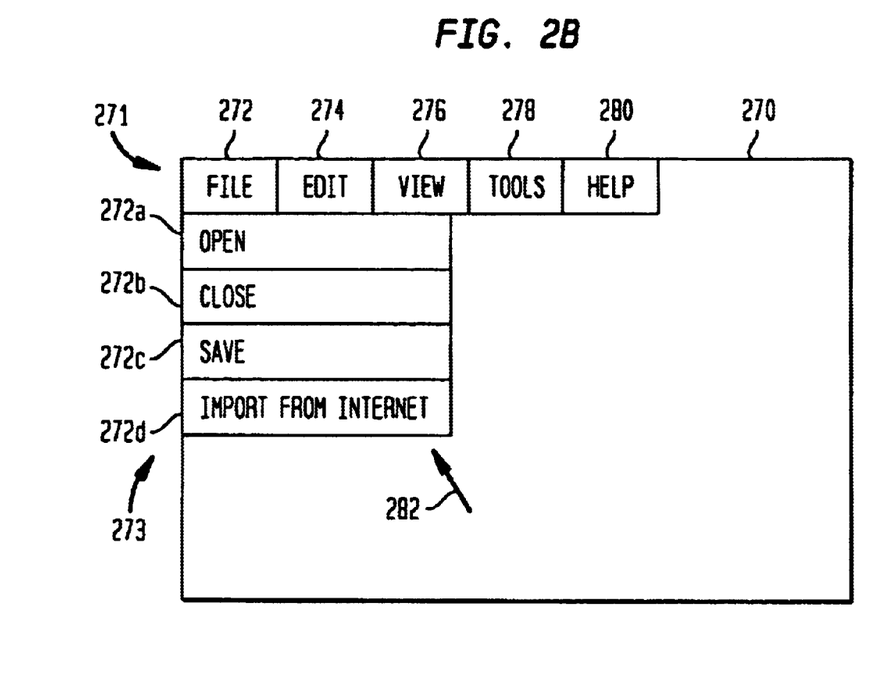
FIG. 2B is an exemplary screen display produced by one embodiment of the invention when displaying a main window.

In one embodiment of the invention, the mailing list manager 206 has an Internet import module (IIM) 208, as shown in FIG. 2A. In a preferred embodiment, the IIM 208 forms an integral part of the mailing list manager 206. As shown in FIG. 2B, when the mailing list manager 206 with the IIM 208 is in operation on computer 2, the IIM 208 generates a screen display comprising a main window 270 on the display 120. The main window 270 has a command pane 271 that displays commands labeled File 272, Edit 274, View 276, Tools 278, and Help 280. The operating system 200 displays a cursor 282 over the main window 270; a user controls the cursor 282 by moving the mouse 140. When the user positions the cursor 282 over the File command 272 and presses a button on the mouse 140, the IIM 208 displays a File pull-down menu 273. The File pull-down menu 273 has functions including an Open function 272a, a Close function 272b, a Save function 272c, and an Import From Internet function 272d. The Open function 272a, Close function 272b, and Save function 272c are examples of functions that can be provided by the IIM 208; however, they are not required, and other functions may be provided.

Figure 2C:
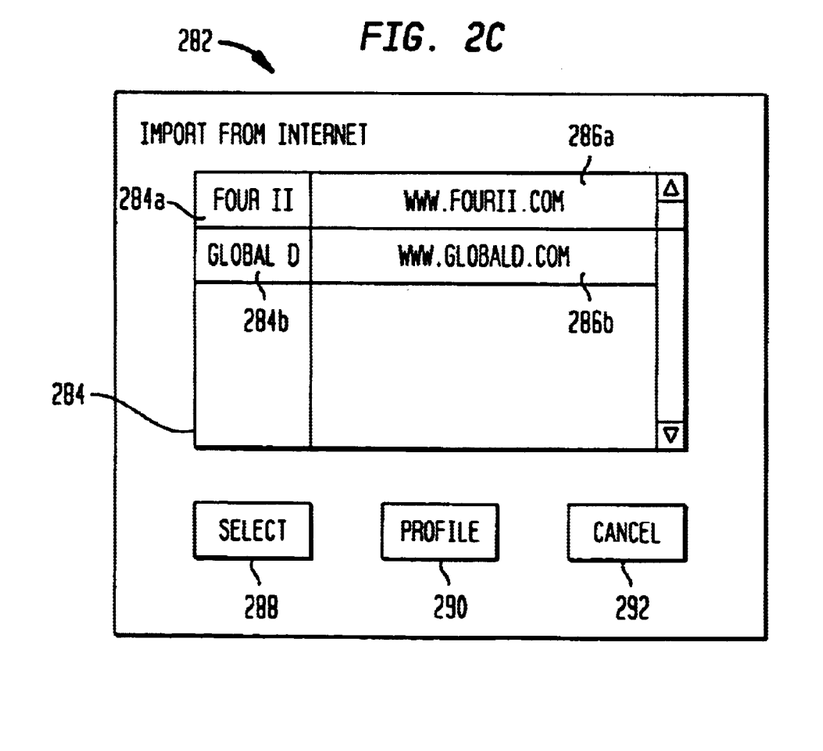
FIG. 2C is an exemplary Import From Internet dialog box displayed by one embodiment of the invention.

When the user positions the cursor 282 over the Import From Internet function 272d and presses a button on the mouse 140, as shown in FIG. 2C, the IIM 208 displays an Import From Internet dialog box 282. The dialog box 282 has a network resource list 284 that lists one or more network resources 282a, 284b. For example, a first network resource 282a is named Four11 and has a network address 286a of "www.four11.com." Thus, in this embodiment, the network addresses are URLs. The dialog box 282 has a scroll bar 287; by positioning the cursor 282 on the scroll bar 287, a user can cause the network resource list 284 to display more network resources.

The Import From Internet dialog box 282 has a Select function button 288, a Profile function button 290, and a Cancel function button 292. Each of the function buttons 288, 290, 292 is associated with program code in the IIM 208 that carries out processing steps in response to activation of the associated function button.

When the user positions the cursor on the Cancel function button 292 and clicks the mouse 140, the IIM 208 closes the dialog box 282, closes the pull-down menu shown in FIG. 2B, and discontinues further processing.

To cause the IIM to connect to a network resource and automatically import information from it, the user positions the cursor on the Select function button 292 and clicks the mouse 140. In response, the IIM 208 closes the dialog box 282, and reads a Site Profile file 220 associated with the selected network resource. The Site Profile file 220 is a table that has a row for each network resource, and is indexed by an integer value that uniquely identifies the network resource. Each record of the Site Profile file 220 has information that is used by the IIM 208 to connect to a network resource, import information from the network resource, and format the imported information for use by the mailing list manager 206.

The Site Profile file 220 is coupled to a Site Index file 230. The Site Index file 230 is an index to the Site Profile file 220. Each record in the Site Index file 230 is a pair of values. One element in the pair is a unique index number that uniquely identifies each record in the Site Profile file 220. The other element in the pair is a pointer to the location in the Site Profile file 220 of the record identified by the index number. In this manner, the Site Profile file 220 can be a file of sequential records that is maintained in a non-ordered manner, and the index file can be a random-access file that is sorted as necessary, and enables rapid access to records in the Site Profile file 220. In an alternate embodiment, the Site Profile file 220 is self-indexing.

In the preferred embodiment, each record in the Site Profile file 220 stores information in the fields shown in Table 1.

TABLE 1

SITE PROFILE FILE FORMAT

| FIELD | CONTENTS |
| --- | --- |
| Site Identifier | Integer index value |
| Name | Common name of network resource name |
| Home Address | Network address or URL of the home page of the network resource |
| Search Addr1 | URL of the first page in the network resource that permits a user to enter a search query |
| Search Addr2 | URL of a second page in the network resource that permits a user to enter a search query (if any) |
| Searchable Fields | Pointer to a list of fields in the page at Search Addr1 that can be searched upon |
| Booleans | Whether boolean search queries are permitted |
| Returned Fields | Pointer to a list of fields that are returned in response to a search query |

Record Template Pointer to a template describing the data format of the fields that are returned in response to a search query
HTML Template Pointer to an HTML template describing the format of an
HTML page that is returned by the network resource in response to a search query
MaxRecordsInteger value of the maximum number of records returned by the network resource in response to a search query
Cookie Flag Boolean flag indicating whether the network resource needs to set cookies to respond to a search query
Timeout Value Integer value representing a number of seconds that the IIM 208 should wait to connect to the network resource; failure of the network resource to respond in that time is defined as a timeout
Retries Integer value representing the maximum number of times the IIM 208 should attempt connection to the network resource before giving up Also in the preferred embodiment, the Site Profile file 220 and its associated Site Index file 230 are periodically updated from a central data storage location. The central data storage site is a Web server known as Site Profile Update Server connected to the Internet 50. The Site Profile Update Server stores a current copy of the Site Profile file 220 and the Site Index file 230, containing records for each known network resource. The IIM 208 has a File Update module associated with and accessed by an Update Profiles command in the File pull-down menu 273. When the user selects the Update Profiles command, the File Update module of the IIM 208 commands the modem 190 or the communications port 185 to contact the Site Profile Update Server and establish an HTTP session with it. Preferably, the session is conducted in a secure manner to prevent unauthorized access to the Site Profile Update Server. For example, the HTTP session is conducted using Netscape Navigator as the browser 204, and the Site Profile Update Server communicates with the browser 204 using the Secure Sockets Layer (SSL) protocol. In a secure way, the browser 204 sends a password to the Site Profile Update Server. In response, the Site Profile Update Server transfers a copy of the then-current version of the Site Profile file 220 and the Site Index file 230. As the current version of each file is received, the File Update module of IIM 208 instructs the OS 200 to write the current version over the copy of the file stored on the storage devices 171, 172, 173. In this way, current versions of site profiles are downloaded to replace existing copies of the profiles.

After reading the Site Profile file 220 associated with the selected network resource, the IIM 208 requests the user to enter search criteria identifying the information to be imported from the selected network resource. The type of search criteria entered by the user is dependent upon information in the Site Profile file for the selected network resource, such as the fields that can be searched, or whether Boolean queries are allowed.

Figure 2D:
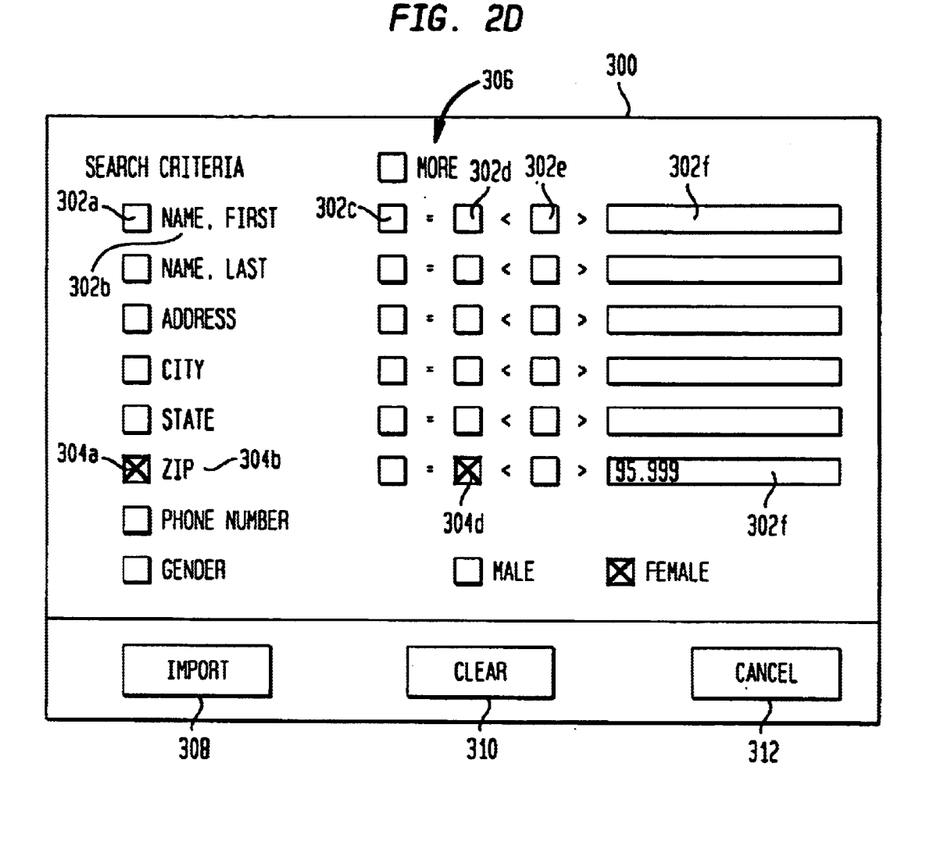
FIG. 2D is an exemplary Selection Criteria dialog box displayed by one embodiment of the invention.

In one embodiment, the IIM 208 displays a search criteria dialog box 300 having the format shown in FIG. 2D. The search criteria dialog box 300 displays fields that can be searched in the selected network resource and ways to select values of the fields. By checking boxes and entering values in the search criteria dialog box 300, the user can build a query that will be applied to the network resource to create a set of information to be imported.

For example, the search criteria dialog box 300 has a check box 302a associated with a NAME, FIRST field 302b. The field 302b also is associated with an Equal check box 302c, a Less Than check box 302d, a Greater Than check box 302e, and a text field 302f. The user can instruct the IIM 208 to import records having NAME, FIRST values equal to "MICHAEL" by clicking on the check boxes 302a and 302c and typing "MICHAEL" in the text field 302f. In the example of FIG. 2D, the user has clicked on the ZIP check box 302a and the check box 304d, and entered "95999" in the ZIP text field 302f. These entries instruct the IIM 208 to request the network resource to import records having ZIP values less than "95999."

The search criteria dialog box 300 also has a MORE check box 306. When a user clicks on the MORE check box 306, the IIM 208 will save the selection criteria that has been entered, and display a blank selection criteria dialog box 300. Selection criteria entered in subsequent selection criteria dialog boxes are appended to previously entered selection criteria. In this way, a user can build a complex query.

The number, name, layout, and arrangement of the fields, check boxes, and text fields in the search criteria dialog box 300 are defined by the Site Profile file 220.

In an alternative embodiment, the IIM 208 displays a dialog box that enables the user to enter a query in the Structured Query Language (SQL). This embodiment is used when the network resource is a web server 60 that has a database 64 that can accept and respond to SQL queries.

The Search Criteria dialog box 300 has an Import function button 308, a Clear function button 310, and a Cancel function button 312. If a user clicks on the Clear function button 310, the IIM 208 discards any selection criteria that have been entered in the dialog box 300 and displays an empty, fresh dialog box 300. If a user clicks on the Cancel function button 312, the IIM 208 closes the dialog box 300 and discontinues further processing.

When the user clicks on the Import button 308, the IIM reviews and tests the selection criteria that have been entered to determine whether they are valid and complete. If not, the IIM displays an appropriate error message and prompts the user to enter correct data.

When all the selection criteria are valid and complete, the IIM 208 connects to the network resource, submits the selection criteria, imports a set of information described by the selection criteria from the network resource, and stores the set of information in a format that is usable by a local processing resource such as the mailing list manager 206.

In the preferred embodiment, the IIM 208 attempts to establish an HTTP connection, through the Internet 50, to a Web server 60 identified by the URL value contained in the Home Address field of the Site Profile file 220. Using OLE Automation, the IIM 208 in the role of controller commands the browser 204 in the role of server to issue the HTTP GET command to the Web server 60, with the selected URL as an argument. If the Web server 60 fails to respond within the Timeout period, or if the browser 204 reports an error to the IIM 208, the IIM raises an error condition and processing is discontinued.

If the HTTP GET command is successful, the home page or initial page of the website identified by the URL is retrieved to a cache memory of the computer 2 and displayed on the display 120. The IIM 208 assembles the search criteria into a query having a format that is understood by the Web server 60, according to information in the Site Profile file 220. The IIM 208 then requests a search page from the Web server 60. The search page is an HTML document of the Web server 60 that is identified in the Site Profile file 220 as the page at which a search query is entered.

Search pages for retrieving information from a Web server are known in general. When a user connects the search page of a Web server using a browser and without using the invention disclosed herein, the user may enter text or numeric values in search fields of the search page. The user then presses a button labeled "Submit", or the equivalent, in the search page. This causes the browser to return a copy of the search page to the Web server including the text or numeric values entered by the user. The Web server reads the text or numeric values and retrieves or prepares another Web page according to the values that were entered. In some systems, the Web server queries a database based upon the values that were entered, and prepares a Web page containing values retrieved from the database in response to the query. The Web page is then sent to the browser for display.

According to the invention, when the search page is returned to the browser 204 by the Web server 60 of a directory service, the IIM 208 makes a copy of the search page in main memory, and fills the copy of the search page with values of the search criteria. The IIM 208 then commands the browser 204 to send the filled-in copy of the search page back to the server 60. When the server 60 receives the filled-in copy of the search page, the server 60 reads the values of the search criteria and prepares a query to the database 64. The server 60 submits the query to the database 64 across the firewall 62. The database responds by providing a set of information matching the query to the server 60. The server 60 formats the set of information for delivery to the browser 204. In one embodiment, the server 60 reads an HTML template from the storage device 66, makes a copy of the template, and writes the set of information into the copy of the template. Thus, the filled-in copy of the template is an output page from the server 60. The output page is delivered through the Internet 50 to the browser 204. In this way, the server 60 processes and responds to the search request received from the IIM 208 in a manner similar to that generally used for requests from browsers that do not form part of the invention. The server 60 does not "know" that the IIM 208 is issuing the search request. Advantageously, the invention does not require modification of an existing server of a directory service.

When the output page is received at the browser 204, the IIM 208 reads the output page. Referring to the HTML Template value for the network resource in the Site Profile file 220, the IIM 208 locates the set of information in the output page. The set of information is written to a Raw List file 240. Thus, using the HTML Template value, the IIM 208 essentially strips out unnecessary HTML information from the output page, leaving only the raw data derived from the database 64 in the Raw List 240.

Using the Record Template value for the selected network resource, the IIM 208 reads each record from the Raw List file 240, applies conversion criteria read from the Record Template, and writes one or more records or fields in a Formatted List file 250. In this way, the IIM 208 converts the information imported from the database 64 into a format that is usable by the mailing list manager 206.

For example, the database 64 stores the middle initial of an individual's name concatenated with the first name of the individual, whereas the mailing list manager 206 stores the middle initial and first name in separate fields. In this example, the Record Template would describe the format of each record in the database 64 as delivered in the output page. The IIM 208 would read each first name value from the Raw List file 40, identify the middle initial value, and write the first name and middle initial separated by a delimiter character in the Formatted List file 250. In the preferred embodiment, the mailing list manager 206 has an integral Import Wizard facility. The Import Wizard is program code that can receive from a user a description of values and records in an input file, read the input file, convert records in the input file into a format usable by the mailing list manager 206, and write values from the records to the mailing list database 260. One known program usable as a mailing list manager that has an Import Wizard is the Pitney Bowes SmartMailer product.

After writing the Formatted List file 250, the IIM 208 passes the Record Template value and the name of the Formatted List file 250 to the Import Wizard of the mailing list manager 206, and commands the mailing list manager 206 to import the Formatted List file 250. In response, the Import Wizard reads the Record Template value, reads each record of the Formatted List file 250, and writes values from the records into the mailing list database 260.

Thereafter, the mailing list manager 206 is used in conventional manner to prepare mailing lists from the imported information, according to desired selection criteria, and to store the lists on one of the storage devices 171, 172, 173. Mailing labels or the mailing lists are printed on the printer 154. Customized documents for printing and mailing are generated using the mailing list manager 206 with the imported information. The mailing list manager 206 may be used to modify the imported information or to select a range of records from the imported information. In this way, free information is imported from a network resource for use by a local processing resource, for example, in creating, managing and using mailing lists derived from the free information.

Figure 3:
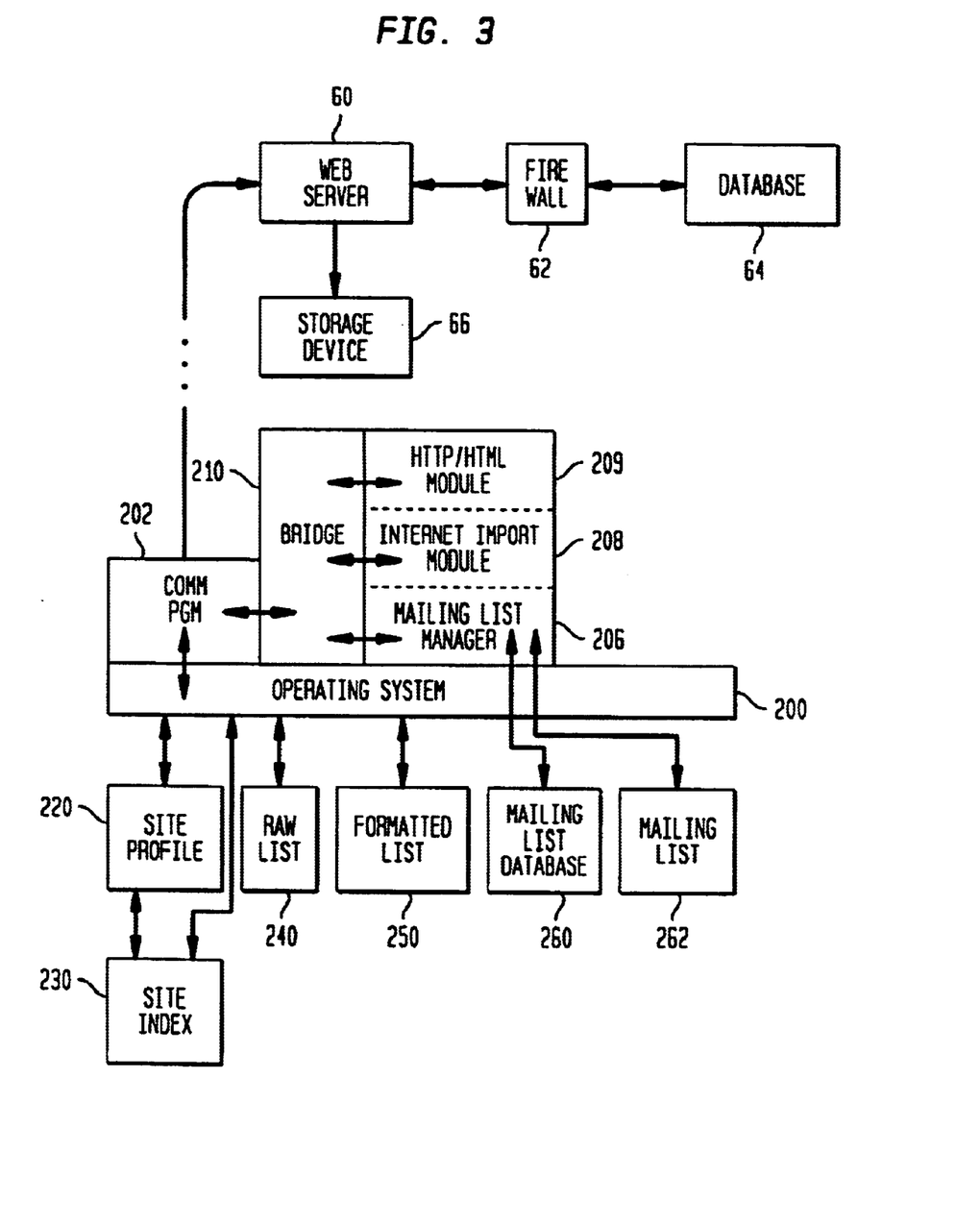
FIG. 3 is a block diagram of a software architecture of an alternate embodiment of the invention.

An alternate embodiment is shown in FIG. 3. In this embodiment, HTTP communication functions and HTML interpretation functions of the browser 204 are provided in an HTTP/HTML module 209 that is integrated into the mailing list manager 206. Functions and processes performed by the browser 204 in the preceding discussion are performed by the HTTP/HTML module 209 in the embodiment of FIG. 3. The embodiment of FIG. 3 is advantageous in that it does not require the end user to use, obtain, or install a browser program. In addition, it enables the IIM 208 to be prepared with less reliance on the bridge software 210; communication between IIM 208 and the module 209 can be hard coded into the IIM 208 and the module 209.

In another alternative of the embodiment of FIG. 2A, when the IIM 208 issues commands to the browser 204, the IIM 208 instructs the browser 204 not to display Web pages received from the Web server 60 on the display 120. In this way, from the user's perspective, actions of the browser occur in the background so that the main window 700 of the IIM 208 is not disturbed. In yet another alternate embodiment, the IIM 208 is a browser plug-in that is stored in association with the browser 204. In this embodiment, when a user loads and executes the mailing list manager 206, the mailing list manager 206 loads the browser 204. In turn, when the browser 204 loads, it loads the IIM 208, attaches the IIM 208 to itself, and executes the IIM 208 in the manner generally known in the art for installing and executing browser plug-ins. The advantage lies in improved speed performance over OLE automation techniques.

In still another alternate embodiment, the IIM 208 is an applet written in the Java language. In still a further alternate embodiment, the IIM 208 is an Active-X control. In each of these embodiments, when a user loads and executes the mailing list manager 206, the mailing list manager 206 loads the browser 204. In turn, when the browser 204 loads, it loads the IIM 208, attaches the IIM 208 to itself, and executes the IIM 208 in the generally manner known in the art for installing and executing applets and Active-X controls. The use of JAVA allows constant version control through updates, while Active-X allows improved speed over OLE automation.

The invention also encompasses certain methods. In one embodiment, a method of importing information from a network resource has the steps shown in FIG. 4A. In step 350, a user of the method creates a set of selection criteria for the information to be imported. In step 352, a connection is established to a resource that is remote, such as a network resource. The network resource stores a set of information from which a subset is to be imported. In step 354, information from the network resource is requested according to the selection criteria. In step 356, the information is locally received.

Figure 4A:
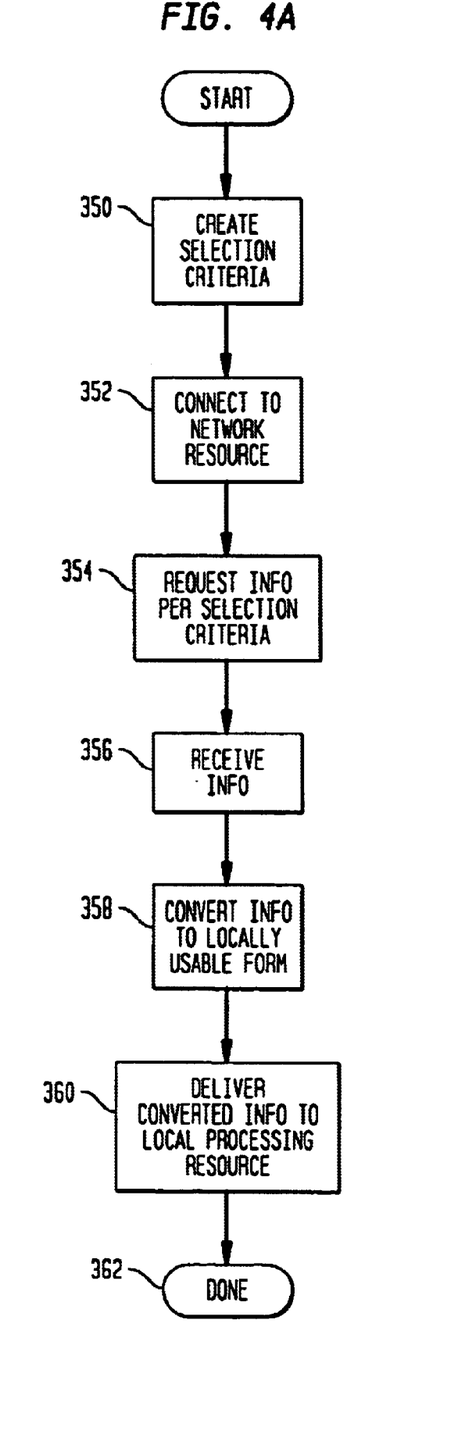
FIG. 4A is a flowchart of a method according to one embodiment of the invention.

In step 358, the received information is converted to a form that is usable by a local processing resource. In step 360, the converted information is delivered to the local processing resource for use by it. In step 362, the process is complete.

Figure 4B:
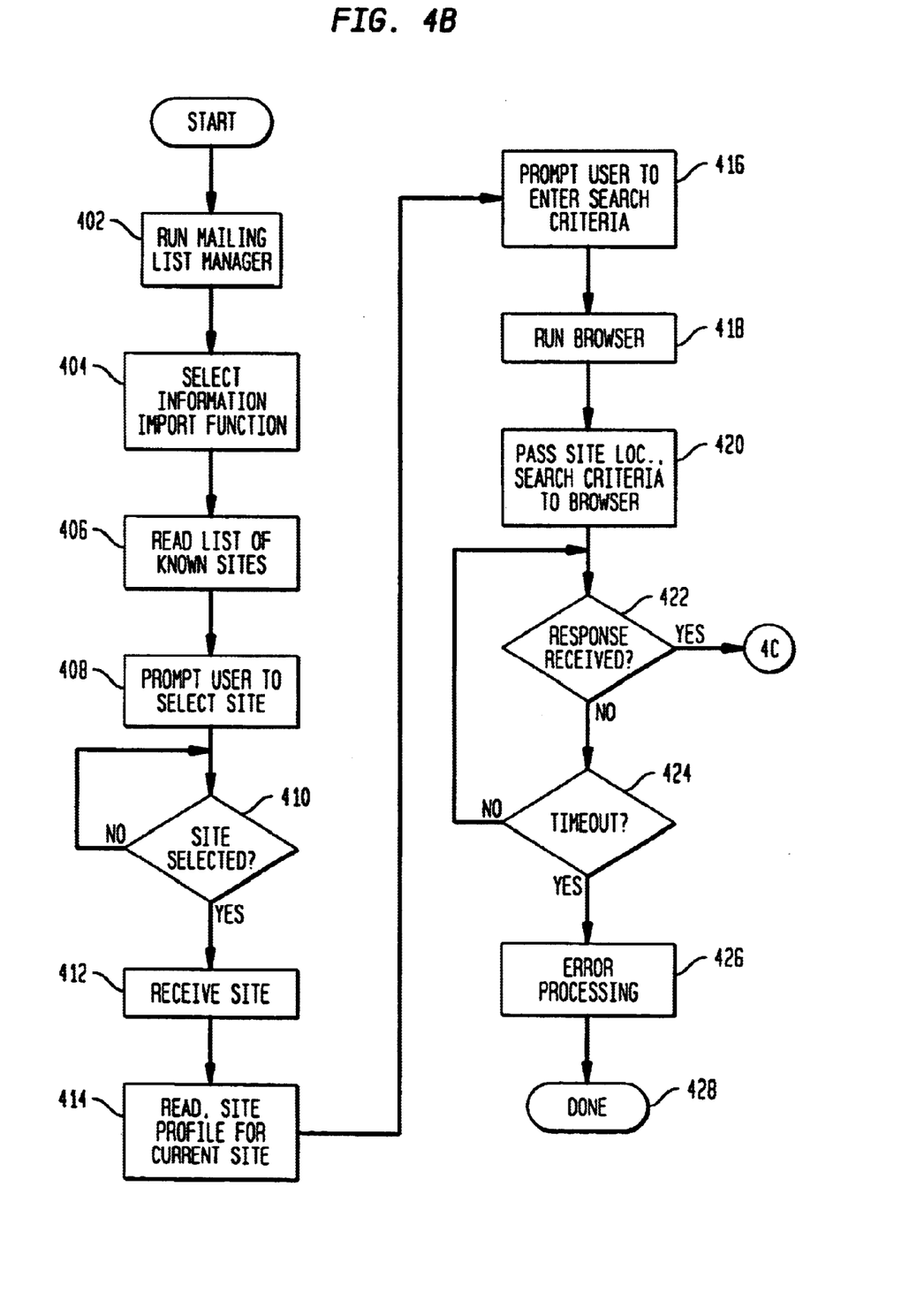
FIG. 4B is a flowchart of a first portion of a method according to an alternate embodiment of the invention.
Figure 4C:
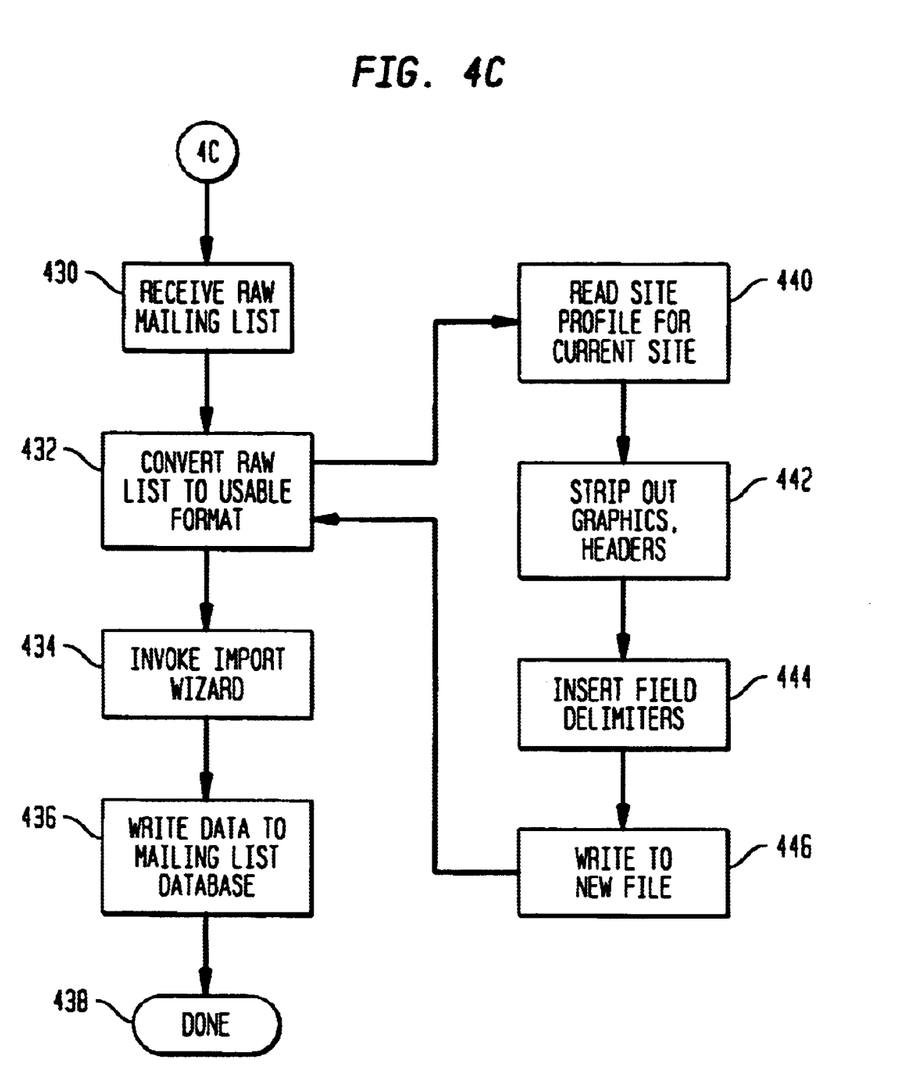
FIG. 4C is a flowchart of a second portion of the method of FIG. 4B.

An alternate embodiment of a method for automatically importing information from a network resource has the steps shown in FIG. 4B and FIG. 4C. In this embodiment, in step 402, a mailing list manager is run or executed. In step 404, a user of the process selects an information import function of the mailing list manager. In step 406, a list of known network resources or information sites is read. The user of the process is prompted to select one of the network resources in step 408. In step 410, the process tests whether the user has selected one of the network resources, and if not, enters a loop until a selection is made.

When the user selects a site, the identification of the site is received in step 412. A site profile for the selected site is read in step 414. In step 416, the user is prompted to enter a set of search criteria that describe the information to be imported from the selected site. In step 418, a browser capable of contacting and receiving information from the selected site is invoked or run. The site name and location, and the search criteria, are provided to the browser in step 420.

In step 422, the process tests whether a response has been received from the site by the browser. If not, control is passed to step 424, in which the process tests whether a predetermined timeout factor has elapsed. If not, control returns to step 422 to again test whether a response is received. If a timeout has occurred, then in step 426 the process reports an error and prepares to discontinue processing. The process then ends in step 428. When a response is received from the site, the test of step 422 is affirmative, and control is passed to step 430, in which a raw mailing list is received from the site.

In step 432, the raw mailing list is converted to a format that is usable by a local processing resource. In one embodiment, the local processing resource is a mailing list manager, and step 432 includes substep 440 through substep 446. In step 440, the profile of the selected site is read to identify the expected format of the raw mailing list. In step 442, using the information read from the site profile, unnecessary information such as graphics and header text is stripped out of the raw mailing list. In step 444, delimiters that identify data values in the raw mailing list are inserted into the list. The re-formatted list is written to an output file in step 446.

In step 434, an import wizard function of the mailing list manager is invoked. Using the import wizard, the mailing list manager reads the output file that was written in step 446, identifies discrete data values from the records of the output file, and writes the data values to a database that is coupled to and maintained by the mailing list manager. The process concludes in step 438.

The invention also encompasses a computer program product configured to carry out the processing steps described herein. The computer program product is embodied in a memory medium such as a floppy disk, CD ROM, hard disk, magnetic tape, or Digital Video Disk compatible with the drives 171, 172, 173 of FIG. 1B. The memory media contain program information for controlling the computer shown in FIG. 1A and FIG. 1B to enable the computer to perform functions and processes according to the invention. The memory media also contain program information for establishing in the main memory of the computer the software architecture of the invention shown in FIG. 2A and FIG. 3, and the alternative software architecture embodiments discussed herein.

While certain embodiments have been described above in terms of URLs, the invention is not limited to the use of URLs. A URL is one example of a network address, and the term "network address" is intended to refer broadly to any type of hypertext link or other reference in a source document to another network location or document. In addition, the invention is intended to be applicable broadly to systems that can access documents through a network, of which the World Wide Web is one example.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of importing information from a remote resource located on a network, comprising the steps of:
   (a) storing selection criteria in a memory coupled to a local processing resource and wherein said selection criteria comprises access instructions for accessing said remote resource and storing a query in a Web page on a storage device accessible to a browser;
   (b) requesting said information from said remote resource according to said selection criteria by submitting said Web page and said query using said browser to a Web server over said network;
   (c) receiving said information from said remote resource over said network and receiving an output Web page at said browser comprising said information from said remote resource; and
   (d) providing said information to said local processing resource in a format usable by said local processing resource and as based upon a profile stored in said memory and describing said format wherein said format corresponds to a data format available at said remote resource and further comprising the steps of:
      (i) writing a raw mailing list derived from said information on said storage device;
      (ii) formatting said raw mailing list into a formatted list according to a format of a database coupled to a mailing list manager and coupled to said local processing resource; and
      (iii) importing said formatted list into said database of said mailing list manager using an automatic import function of said mailing list manager.

2. The method recited in claim 1, wherein the step of requesting said information further comprises the step of: connecting to said remote resource using an application program driven by said local processing resource.

3. The method recited in claim 1, wherein the step of requesting said information further comprises the step of: connecting to said remote resource using a browser driven by said local processing resource using a bridge.

4. The method recited in claim 1, wherein the step of requesting said information further comprises the step of: connecting to said remote resource using a browser driven by said local processing resource using OLE Automation.

5. The method recited in claim 1, further comprising the steps of: storing, in said memory, a list of a plurality of remote information sources located on said network and a profile describing a first format of said information at one of said remote information sources.

6. The method recited in claim 5, wherein the step of storing said list further comprises the step of: retrieving current versions of said list and said profile from a central data storage location on said network.

7. The method recited in claim 5, wherein the step of providing said information further comprises the step of: converting said information from said first format to a second format usable by said local processing resource according to said profile.

8. The method recited in claim 7, wherein the step of providing said information further comprises the steps of:
   (a) invoking an import function of said local processing resource; and
   (b) using said import function, storing said information in said second format in a database coupled to said local processing resource.

9. The method recited in claim 1, wherein said step of providing said information comprises the steps of:
   (a) executing a browser; and
   (b) commanding said browser with said local processing resource to connect to said remote information source over said network.

10. A method of importing information from a remote resource located on a network, comprising the steps of:
    (a) storing selection criteria in a memory coupled to a first application program and wherein said selection criteria comprises access instructions for accessing said remote resource, and
       (1) storing a query in a Web page in a storage device coupled to a browser;
       (2) requesting said information comprises the step of submitting said Web page to a Web server using said browser;
       (3) receiving said information comprises the step of receiving an output Web page into said Web browser over said network; and
       (4) providing said information further comprises the steps of:
          (i) writing a raw mailing list derived from said output Web page on said storage device;
          (ii) formatting said raw mailing list into a formatted list based upon a format of a database coupled to a mailing list manager; and
          (iii) importing said formatted list into said database of said mailing list manager using an automatic import function of said mailing list manager;
    (b) requesting said information from said remote resource using said first application program and according to said selection criteria;
    (c) receiving said information from said remote resource over said network; and
    (d) providing said information to a second application program in a format usable by said second application program and as based upon a profile stored in said memory and describing said format wherein said format corresponds to a data format available at said remote resource.

11. Computer apparatus comprising:
    (a) a processor, wherein said processor is configured to:
       (i) retrieve current versions of said list and said profile from a central data storage location on said network;
       (ii) convert said information from said first format to a second format usable by said local processing resource according to said profile;
       (iii) invoke an import function of said local processing resource;
       (iv) store said information, using said import function, in said second format in a database coupled to said local processing resource;
       (v) execute a browser;
       (vi) command said browser with said local processing resource to connect to said remote information source over said network;
       vii) store a query in a Web page on a storage device accessible to a browser;

(viii) submit said Web page and said query using said browser to a Web server over said network;

(ix) receive an output Web page at said browser comprising said information from said remote resource;

(x) write a raw mailing list derived from said information on said storage device;

(xi) format said raw mailing list into a formatted list according to a format of a database coupled to a mailing list manager and coupled to said local processing resource; and (xii) import said formatted list into said database of said mailing list manager using an automatic import function of said mailing list manager; and (b) a memory coupled to said processor; the memory having stored therein an identifier of at least one remote information source located on a network coupled to said processor, in which said processor is configured to:

(i) store selection criteria in a memory coupled to a local processing resource;

(ii) request said information from said remote resource according to said selection criteria;

(iii) receive said information from said remote resource over said network; and (iv) provide said information to said local processing resource in a format usable by said local processing resource.

12. The apparatus recited in claim 11, wherein said processor is configured to connect to said remote resource using an application program driven by said local processing resource.

13. The apparatus recited in claim 11, wherein said processor is configured to connect to said remote resource using a browser driven by said local processing resource using a bridge.

14. The apparatus recited in claim 11, wherein said processor is configured to connect to said remote resource using a browser driven by said local processing resource using OLE Automation.

15. The apparatus recited in claim 11, wherein said processor is configured to store, in said memory, a list of a plurality of remote information sources located on said network and a profile describing a first format of said information at one of said remote information sources.

16. A computer software product that includes a medium readable by a processor, the medium having stored thereon a sequence of instructions which, when executed by said processor, causes said processor to import information by causing said processor to execute the steps of:

(a) storing selection criteria in a memory coupled to a local processing resource and wherein said selection criteria comprises access instructions for accessing said remote resource;

(b) requesting said information from said remote resource according to said selection criteria;

(c) receiving said information from said remote resource over said network;

(d) providing said information to said local processing resource in a format usable by said local processing resource and as based upon a profile stored in said memory and describing said format wherein said format corresponds to a data format available at said remote resource;

(e) converting said information from said first format to a second format usable by said local processing resource according to said profile;

(f) invoking an import function of said local processing resource;

(g) using said import function, storing said information in said second format in a database coupled to said local processing resource;

(h) executing a browser;

(i) commanding said browser with said local processing resource to connect to said remote information source over said network;

(j) storing a query in a Web page on a storage device accessible to a browser;

(k) submitting said Web page and said query using said browser to a Web server over said network;

(l) receiving an output Web page at said browser comprising said information from said remote resource;

(m) writing a raw mailing list derived from said information on said storage device;

(n) formatting said raw mailing list into a formatted list according to a format of a database coupled to a mailing list manager and coupled to said local processing resource; and (o) importing said formatted list into said database of said mailing list manager using an automatic import function of said mailing list manager.

17. The computer software product recited in claim 16, wherein said sequence of instructions causes said processor to execute the step of connecting to said remote resource using an application program driven by said local processing resource.

18. The computer software product recited in claim 16, wherein said sequence of instructions causes said processor to execute the step of connecting to said remote resource using a browser driven by said local processing resource using a bridge.

19. The computer software product recited in claim 16, wherein said sequence of instructions causes said processor to execute the step of connecting to said remote resource using a browser driven by said local processing resource using OLE Automation.

20. The computer software product recited in claim 16, wherein said sequence of instructions causes said processor to execute the step of storing, in said memory, a list of a plurality of remote information sources located on said network and a profile describing a first format of said information at one of said remote information sources.

21. The computer software product recited in claim 20, wherein said sequence of instructions causes said processor execute the step of retrieving current versions of said list and said profile from a central data storage location on said network.

* * * * *